United States Patent [19]

Kepes

[11] Patent Number: 4,607,704
[45] Date of Patent: Aug. 26, 1986

[54] POWER RAKE

[76] Inventor: Josef Kepes, 7630 N. Oketo, Niles, Ill. 60648

[21] Appl. No.: 615,746

[22] Filed: May 31, 1984

[51] Int. Cl.⁴ .................. A01B 33/14; A01B 45/02
[52] U.S. Cl. ............................ 172/42; 172/21; 172/96; 172/121; 172/553; 56/16.7; 56/400.03
[58] Field of Search .............. 111/89, 91; 56/16.6, 56/16.7, 16.5, 400.02, 400.03, 400.18, 400.21; 172/21, 22, 96, 121, 123, 540, 541, 550, 552, 553

[56] References Cited

U.S. PATENT DOCUMENTS

| | | | |
|---|---|---|---|
| 2,090,973 | 8/1937 | Basham | 172/121 X |
| 2,229,497 | 1/1941 | Dontje | 172/21 |
| 2,400,204 | 5/1946 | Lindskog | 172/21 |
| 2,552,382 | 5/1951 | Root | 56/400.02 X |
| 3,125,844 | 3/1964 | Beyer | 172/123 X |
| 3,199,278 | 8/1965 | Dye | 56/16.7 |
| 3,934,390 | 1/1976 | Ballard | 172/21 X |
| 4,446,681 | 5/1984 | Dynie et al. | 56/16.7 |

OTHER PUBLICATIONS

"Agco Culta Tiller with Tiger Tines," Agco advertising brochure, 1982, AGCO, Huntington Valley, PA 19006.

Primary Examiner—Richard J. Johnson
Assistant Examiner—Terrence L. B. Brown

[57] ABSTRACT

A lightweight hand propelled power rake having a motor driven rotatable rake wheel providing a plurality of radially extending prongs arranged in a plurality of sets, with the prongs of each set projecting through a sole plate. The device includes a method of adjusting the sole plate along the length of each set of prongs so as to determine the depth of penetration of such prongs.

14 Claims, 4 Drawing Figures

POWER RAKE

SUMMARY OF THE INVENTION

This invention relates to a lightweight hand propelled power rake including a power drive for rotating a rake wheel as the apparatus is manually propelled over the ground.

It is an object of this invention to provide a power rake that is simple to use, economical to manufacture, yet highly effective for its intended purpose.

To accomplish the objects of this invention the power rake consists of a tubular U-shaped frame that rotatably supports a rake wheel positioned between the free ends of the parallel legs of the frame. A power unit such as an electric motor or a internal combustion engine through means of a simple drive train is adapted to rotate the rake wheel.

The rake wheel consists of a plurality of sets or series of prongs with the prongs of each set projecting through an adjustable sole plate that regulates the depth of penetration of the prongs.

The frame is supported on a pair of wheels for ease in transporting the same over the terrain to be worked.

Other objects of the invention will appear hereinafter.

DESCRIPTION OF DRAWINGS

The invention will be best understood by reference to the drawings which illustrate the preferred mode of construction by which the stated objects of the invention are achieved, and in which.

GENERAL DESCRIPTION

Figure 1:
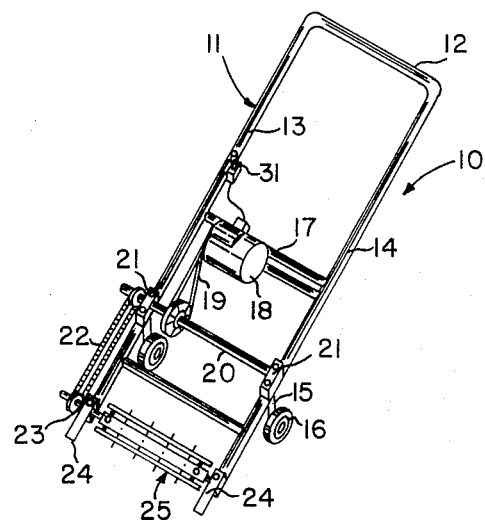
FIG. 1 is a perspective view of the power rake of this invention.

As illustrated in the drawings the power rake 10 consists of a U-shaped frame 11 which provides a handle 12 and a pair of parallel legs 13 and 14. Mounted on each of the legs 13 and 14 are wheel posts 15 that in turn support ground engaging wheels 16.

Extending between the legs 13 and 14 in a spaced parallel relation to the handle 12 is a cross brace 17. Mounted upon the brace 17 is a power source, such as an electric motor 18 as shown.

This motor 18 through a pulley 19 arrangement is connected to a drive shaft 20. The drive shaft 20 has its ends mounted in suitable bearings 21 carried by the legs 13 and 14. Through a chain drive 22 the drive shaft 20 is operatively connected to a driven shaft 23. The driven shaft 23 has its opposite ends mounted in suitable bearings 24 carried by the legs 13 and 14.

A rake wheel 25 is fixedly mounted for rotation upon the driven shaft 23. The rake wheel 25 includes a circular base 26 from which a plurality of rake prongs 27 radially project.

A series of rake prongs 27 are mounted in sets that are angularly disposed at right angles with respect to each other.

Figure 2:
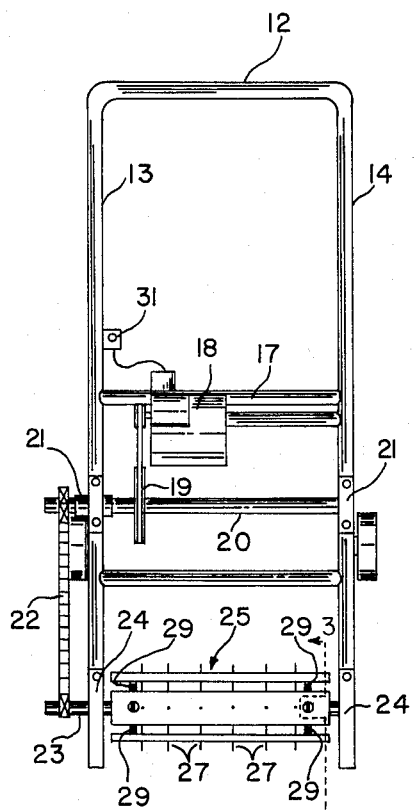
FIG. 2 is a front elevational view of the power rake of the invention.
Figure 3:
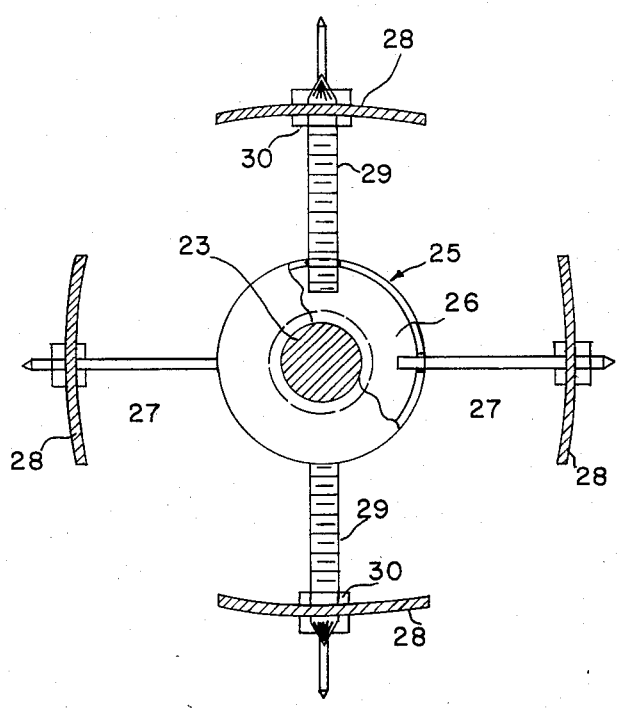
FIG. 3 is a fragmentary side elevational view of the rake wheel of this invention.

Each prong 27 of each set is freely projected through a sole plate 28. Each of the sole plates fixedly carries a nut 30 and is adjustably mounted on the circular base 26 of the rake wheel 25 by a pair of threaded bolts 29. As clearly illustrated in FIGS. 2 and 3 each of the sole plates 28 is freely carried by its bolts 29 between the bolt head and the nut 30 which is threaded upon the bolt 29. Each of the bolts 29 are in turn threadable into the circular base 26 of the rake wheel 25. By this arrangement the threading of the bolt 29 into the circular base 26 will adjustably position the sole plate 28 relative to the long axis of the prongs 27.

It is desired that the U-shaped frame 11 be constructed of a lightweight tubular material.

While the drawings illustrate the use of an electric motor 18 which includes a control switch 31, it is possible that the power source may consist of a small internal combustion engine.

In operation the power source is energized causing the rotation of the rake wheel in an anticlockwise diection as the unit is pulled in the direction of the handles 12 as seen in FIG. 1, through the operative connections between the drive shaft 20 and driven shaft 23. With the depth of the prongs 27 pre-set the operator will grasp the handle 12 and pull the rake over the terrain to be worked.

As the sole plates 28 are slightly arcuate transversely to their length they will present a smooth surface to the ground as they are caused to rotate about a horizontal axis, and by this arrangement will determine the depth of penetration of the prongs 27.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described the invention, what I claim as new and desire to protect by Letters Patent is:

1. A manually propelled power rake comprising,
   (a) a generally U-shaped wheeled frame providing a handle and a pair of spaced parallel legs,
   (b) a power source mounted on said frame,
   (c) a rake wheel journalled between the free ends of said legs of said frame,
   (d) said rake wheel including a driven shaft having a plurality of radially extending prongs with said prongs arranged in aligned sets disposed at right angles with respect to each other,
   (e) plate means carried by said rake wheel and extending along each set of prongs for regulating the depth of penetration of said prongs of each set into the terrain to be worked,
   (f) means for radially adjusting said regulating means relative to the radial length of said prongs of each set of prongs mounted on said rake wheel, and
   (g) means connecting said rake wheel to said power source for rotation thereby about a horizontal axis.

2. A manually propelled power rake as defined by claim 1 wherein said U-shaped frame is constructed from a lightweight material.

3. A manually propelled power rake as defined by claim 1 when said power source comprises an electric motor.

4. A manually propelled power rake as defined by claim 3 wherein said U-shaped frame is constructed from a lightweight material.

5. A manually propelled power rake as defined by claim 1 wherein said plate means for regulating the depth of penetration of said prongs comprise elongated sole plates arcuated transversely to their length and through which each prong freely projects.

6. A manually propelled power rake as defined by claim 5 wherein said U-shaped frame is constructed from a lightweight material.

7. A manually propelled power rake as defined by claim 5 when said power source comprises an electric motor.

8. A manually propelled power rake as defined by claim 4 wherein said plate means for regulating the depth of penetration of said prongs comprise elongated sole plates arcuated transversely to their length and through which each prong freely projects.

9. A manually propelled power rake as defined by claim 1 wherein said means connecting said rake wheel to said power source for rotation comprises a drive shaft journalled between said legs of said frame and having a drive connection to a driven shaft journalled between the ends of said legs of said frame with said rake wheel fixedly mounted thereon for rotation therewith.

10. A manually propelled power rake as defined by claim 9 wherein said plate means for regulating the depth of penetration of said prongs comprise elongated sole plates arcuated transversely to their length and through which each prong freely projects.

11. A manually propelled power rake as defined by claim 1 wherein said means for adjusting said regulating means comprise a pair of bolts threaded into said rake wheel with said regulating means connected thereto for movement therewith toward and away from said rake wheel along the axis of said prongs.

12. A manually propelled power rake as defined by claim 11 wherein said plate means for regulating the depth of penetration of said prongs comprise elongated sole plates arcuated transversely to their length and through which each prong freely projects.

13. A manually propelled power rake as defined by claim 11 wherein said means connecting said rake wheel to said power source for rotation comprises a drive shaft journalled between said legs of said frame and having a drive connection to a driven shaft journalled between the ends of said legs of said frame with said rake wheel fixedly mounted thereon for rotation therewith.

14. A manually propelled power rake as defined by claim 10 wherein said means for adjusting said regulating means comprise a pair of bolts threaded into said rake wheel with a sole plate connected thereto for movement therewith toward and away from said rake wheel along the axis of said prongs.

* * * * *